(12) United States Patent
Roble et al.

(10) Patent No.: US 8,031,975 B2
(45) Date of Patent: Oct. 4, 2011

(54) SYSTEM AND METHOD OF IMAGE ZOOMING WITH INTENSITY PRESERVATION

(75) Inventors: Doug Roble, Culver City, CA (US); Nafees Bin Zafar, Santa Monica, CA (US)

(73) Assignee: Digital Domain Productions, Inc., Venice, CA (US)

( * ) Notice: Subject to any disclaimer, the term of this patent is extended or adjusted under 35 U.S.C. 154(b) by 931 days.

(21) Appl. No.: 12/009,377

(22) Filed: Jan. 17, 2008

(65) Prior Publication Data
US 2009/0041387 A1    Feb. 12, 2009

Related U.S. Application Data

(60) Provisional application No. 60/954,176, filed on Aug. 6, 2007.

(51) Int. Cl.
*G06K 9/32* (2006.01)
(52) U.S. Cl. ........ 382/299; 382/260; 382/274; 382/275; 358/1.2; 358/3.26; 358/3.27
(58) Field of Classification Search .................. 382/282, 382/293, 299, 260, 274, 275
See application file for complete search history.

(56) References Cited

U.S. PATENT DOCUMENTS

| | | | |
|---|---|---|---|
| 6,470,097 B1 | 10/2002 | Lai et al. | |
| 6,529,613 B1 * | 3/2003 | Astle | 382/103 |
| 6,690,843 B1 * | 2/2004 | Squilla et al. | 382/306 |
| 7,043,078 B2 * | 5/2006 | Guleryuz | 382/180 |
| 7,465,913 B2 * | 12/2008 | Chuang et al. | 250/214.1 |
| 7,499,017 B2 * | 3/2009 | Daly | 345/102 |
| 7,532,192 B2 * | 5/2009 | Feng et al. | 345/102 |
| 7,536,098 B2 * | 5/2009 | Suda | 396/153 |

OTHER PUBLICATIONS

Chan, T.F. and Shen, J., "*Variational Image Inpainting*," Jul. 2002, pp. 1-28, http://purl.umn.edu/3805.
Chan, T.F., Shen, J. and Vese, L. "*Variational PDE Models in Image Processing*," Sep. 15, 2002, pp. 1-35, www.math.ucla.edu/imagers.
Chan, T.F., Osher, S. and Shen, J. "*The Digital TV Filter and Nonlinear Denoising*," 2001, pp. 1-25, IEEE Trans. Image. Process. 10(2), 231-241.

* cited by examiner

*Primary Examiner* — Yosef Kassa
(74) *Attorney, Agent, or Firm* — Perkins Coie LLP

(57) ABSTRACT

Systems and methods image zooming with intensity preservation is disclosed. In one aspect, embodiments of the present disclosure include a method, which may be implemented on a system, of minimizing energy levels over a set of high-resolution image pixels of a high-resolution image via total variational filtering to obtain the high-resolution image from at least a portion of a low-resolution image; the low-resolution image having a first energy level, the high resolution image having a second energy level, and the first energy level to be substantially similar in value as the second energy level. One embodiment can include, determining a pixel value of a particular high-resolution image pixel based on the pixel values of a plurality of pixels of the at least a portion of the low-resolution image and the pixel values of the high-resolution image pixels not including the particular high-resolution image pixel.

19 Claims, 5 Drawing Sheets

SYSTEM AND METHOD OF IMAGE ZOOMING WITH INTENSITY PRESERVATION

CLAIM OF PRIORITY

This application claims priority to U.S. Patent Application No. 60/954,176 entitled "Generalized Total Variational Image Zooming", which was filed on Aug. 6, 2007, the contents of which are expressly incorporated by reference herein.

TECHNICAL FIELD

The present disclosure relates generally to image processing, in particular to processing related to image zooming, such as image zooming with intensity preservation.

BACKGROUND

Digital image zooming provides a focused field of view on one area of an image. The image may be from a digital photography or a video image. In most instances, digital zooming can be achieved by interpolating adjacent pixels of the area of the image to be zoomed in on. Image zooming techniques are typically used in several areas of image processing, including but are not limited to, photographical enlarging, image reconstruction, and reducing artifacts. These functions are valuable for image processing in consumer graphics editors, video processing, video players, medical imaging, computer graphics, defense applications, etc.

Many algorithms have been developed for enlarging images. For example, Interpolation functions can be applied to an image for resampling. Typical Interpolation algorithms used for image resampling include the nearest neighbor interpolation which is similar to a sinc function in the frequency domain, a linear function, which attenuates frequencies near the cutoff frequency, a sinc function, a radial basis function, the cubic B-spline, the high-resolution cubic spleens, and the generalized spline filters, for example.

Oftentimes, interpolation functions result in artifacts such as, edge halos, aliasing, and blurring. Therefore, adaptable interpolation techniques suitable for varying local structures of an image have been developed in an attempt to preserve the resolution at edges during interpolation. In addition, structurally adaptive techniques have also been utilized to take advantage of bandwidth and intensity variations unapparent to the human eye.

Images can be segmented into many regions to apply different interpolation functions based on the analysis of the local structure. For example, interpolation, extrapolation or pixel replication can be applied depending on the detected image structures, including a homogeneous area, edge area, or isolated feature area. However, although adaptive interpolation techniques that depend on image content are able to generate sharper images with fewer artifacts compared to that with the non-adaptive interpolation method, they are generally more complex and resource intensive.

However, most of the algorithms for image zooming do not preserve image intensity between the original image and the zoomed image. The perceived intensity by the human eye can potentially affect the perception of sharpness in the zoomed image.

SUMMARY OF THE DESCRIPTION

Systems and methods of image zooming with intensity preservation are described here. Some embodiments of the present disclosure are summarized in this section.

In one aspect, embodiments of the present disclosure include a method, which may be implemented on a system, of enlarging an image by minimizing energy levels of a set of high-resolution image pixels of a high-resolution image via total variational filtering the set of high-resolution image pixels. The high-resolution image can be an enlarged version of at least a portion of a low-resolution image. The at least a portion of the low-resolution image may have an area substantially equal to that of the high-resolution image. In one embodiment, the low-resolution image corresponds to a first energy level and the high resolution image corresponds to a second energy level, the first energy level to have substantially a same value as the second energy level One embodiment further includes determining a first magnitude variation of a high-resolution image pixel and a first neighboring pixel of the high-resolution image pixel and a second magnitude variation of the high-resolution image pixel and a second neighboring pixel of the high-resolution image pixel. In one embodiment, a plurality of magnitude variations between the high-resolution image pixel and a plurality of neighboring pixels of the high-resolution image pixel are determined.

One embodiment further includes filtering the high-resolution image pixels with a filter associated with the plurality of magnitude variations to minimize energy. A pixel value of a particular high-resolution image pixel can be determined based on the pixel values of a plurality of pixels of the at least a portion of the low-resolution image and the pixel values of the high-resolution image pixels not including the particular high-resolution image pixel. One embodiment further includes identifying the pixel values of a set of high-resolution image pixels, such that, the average value of the pixel values of the set of high-resolution pixels is substantially equal to the average of pixel values of the at least a portion of the low-resolution image. In one embodiment, the magnitude variation is computed via the ordinary Euclidean gradient.

The present disclosure includes methods and systems which perform these methods, including processing systems which perform these methods, and computer readable media which when executed on processing systems cause the systems to perform these methods.

Other features of the present disclosure will be apparent from the accompanying drawings and from the detailed description which follows.

DETAILED DESCRIPTION

Figure 1:
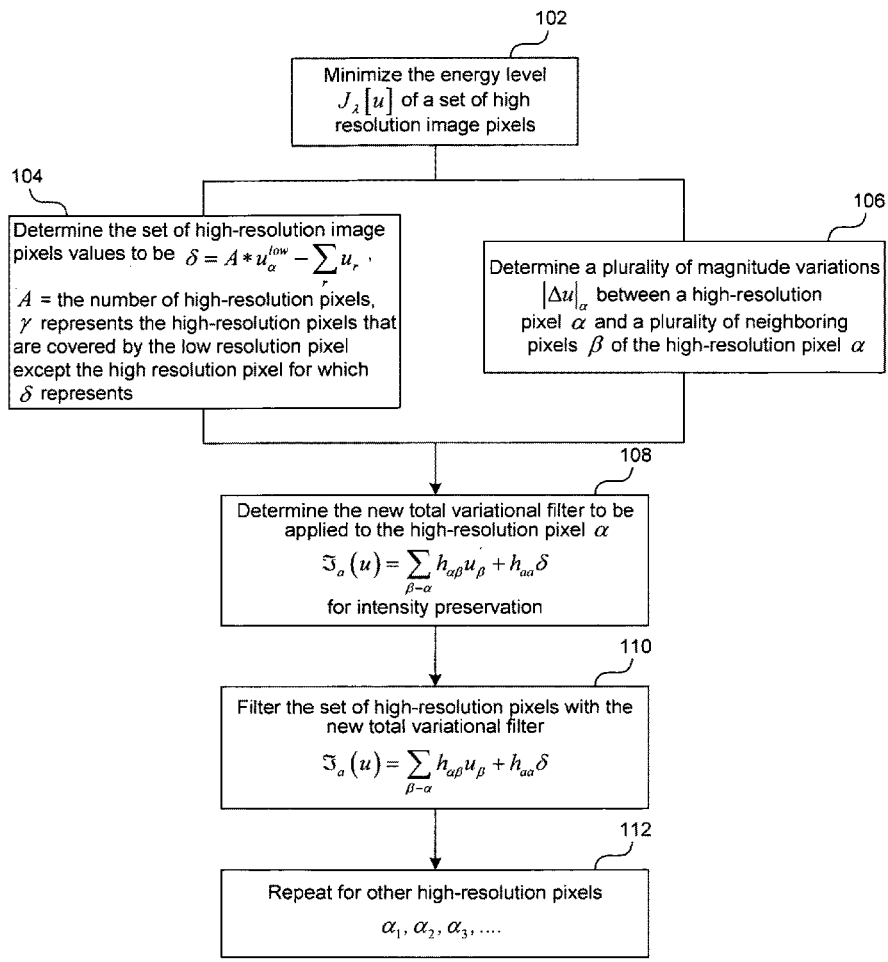
FIG. 1 depicts a flow diagram illustrating an example process of computing a total variational filter for image zooming with intensity preservation, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods of image zooming with intensity preservation. The techniques involved in digital image zooming can be broadly applied to digital photography, image super-resolution, data compression, etc. Yet other imaging related applications that are contemplated and do not deviate from the novel art of this disclosure include, but are not limited to, machine vision, medical image processing, face detection, microscope image processing, etc.

FIG. 1 depicts a flow diagram illustrating an example process of computing a total variational filter for image zooming with intensity preservation, according to one embodiment.

In one aspect, the present disclosure relates to identifying the high-resolution image pixel values in the total variational filters that preserve the intensity of a zoomed image. The digital image zoom-in based on total variational filtering can be achieved by minimizing the energy level $J_\lambda[u]$ of the high-resolution image pixels u, in accordance with process 102. In one embodiment, the total energy level is associated with the magnitude variations $|\nabla u|_\alpha$. For example, the energy level $J_\lambda[u]$ can be represented as:

$$J_\lambda[u] = \sum_{\alpha \in \Omega} |\nabla u|_\alpha + \sum_{\alpha \in \Omega} \frac{\lambda_e(\alpha)}{\alpha}(u_\alpha - u_\alpha^0)^2$$

, where '$\Omega$' is the fine (e.g., high-resolution) grid on which the zoomed-in image u is defined. In the grid '$\Omega$', the high-resolution pixels $\alpha \in \Omega$ have a set of neighboring pixels '$\beta$'. With reference to the example of FIG. 2, if $\alpha=(i, j)$, then '$\beta$' can include the neighboring pixels $(i, j\pm1)$, $(i\pm1)$. In one embodiment, the Lagrange multiplier '$\lambda_e$' can be defined as a function of the fine grid, for example:

$$\lambda_e = \lambda, \alpha \in \Omega$$
$$= 0, \text{otherwise}$$

In process 106, a plurality of magnitude variations $|\nabla u|_\alpha$ between the high-resolution pixel '$\alpha$' and a plurality of neighboring pixels '$\beta$' of the high-resolution pixel '$\alpha$'. In one embodiment, the local variation is the Euclidean gradient, defined by:

$$|\nabla u|_\alpha \equiv \sqrt{\sum_{\beta \sim \alpha} (u_\beta - u_\alpha)^2}$$

In other embodiments, alternate methods of computing the magnitude variations, can include but are not limited to, the wirelength definition of the magnitude variation. In one embodiment, the minimization of the energy level $J_\lambda[u]$ can be achieved by applying the digital total variational filter at a set of high-resolution pixels $\alpha_1, \alpha_2, \alpha_3, \ldots \alpha_n$, etc.

By adjusting the pixel values used in the total variational filter, image intensity can be preserved after zooming. For example, for the zoomed-in image to preserve the energy of the original image, the average pixel value of the high resolution pixels are to be substantially equal to the pixel values of the low resolution pixels corresponding to the high resolution pixels in area. Thus, in process 104, the pixel value of the set of high-resolution image pixels is determined such that, the pixel value can be represented by:

$$\delta = A * u_\alpha^{low} - \sum_\gamma u_\gamma$$

Figure 3:
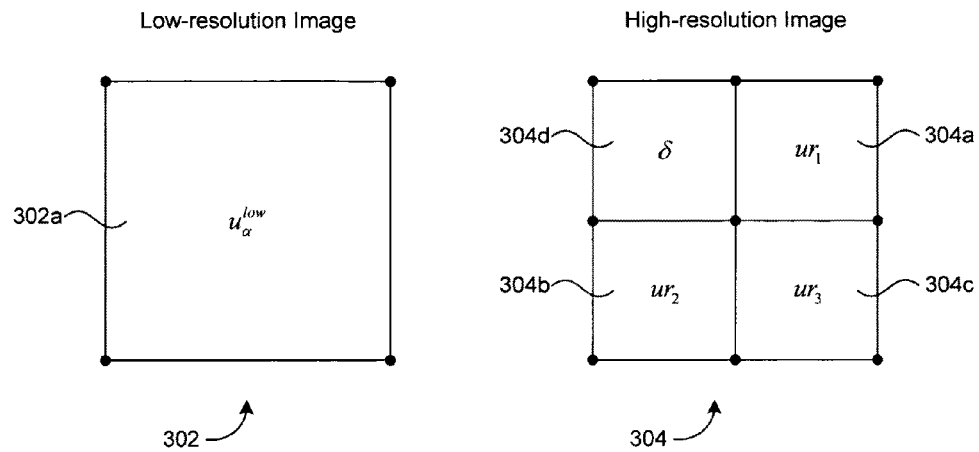
FIG. 3 depicts a diagrammatic view of the pixel values of a low-resolution image and a corresponding high-resolution image for intensity preservation, according to one embodiment.

, where '$\delta$' represents the target pixel value of the current high-resolution pixel to achieve preservation of energy of the high-resolution image, 'A' represents the number of high-resolution pixels, and '$\gamma$' represent the high-resolution pixels covered by the low resolution pixel not including the current high resolution pixel, as shown in FIG. 3. Thus, in one embodiment, the pixel value of a high-resolution pixel is adjusted based on the values of the other high-resolution pixels in the high-resolution image to achieve intensity preservation after image zooming.

In process 108, based on the determined magnitude variations $|\nabla u|_\alpha$ and the pixel values of the high-resolution image, the modified total variational filter $\Im_\alpha(u)$ for image enlargement that preserves image intensity are determined as:

$$\Im_\alpha(u) = \sum_{\beta \sim \alpha} h_{\alpha\beta} u_\beta + h_{\alpha\alpha} \delta$$

In process 110, the modified total variational filter $\Im_\alpha(u)$ is then applied to the high-resolution pixels '$\alpha$'. The energy over the high-resolution image is thus maintained to be substantially constant and equal to the original low-resolution image. In accordance with the novel art of this disclosure, intensity preservation can be achieved for a variety of zoom in factors by modifying the computation of $\delta$ to account for the different number of low-resolution pixels that covers the high-resolution pixels corresponding in area. In process 112, the process described in 102-110 is repeated for high-resolution pixels $\alpha_1, \alpha_2, \alpha_3, \ldots \alpha_n$.

Figure 2:
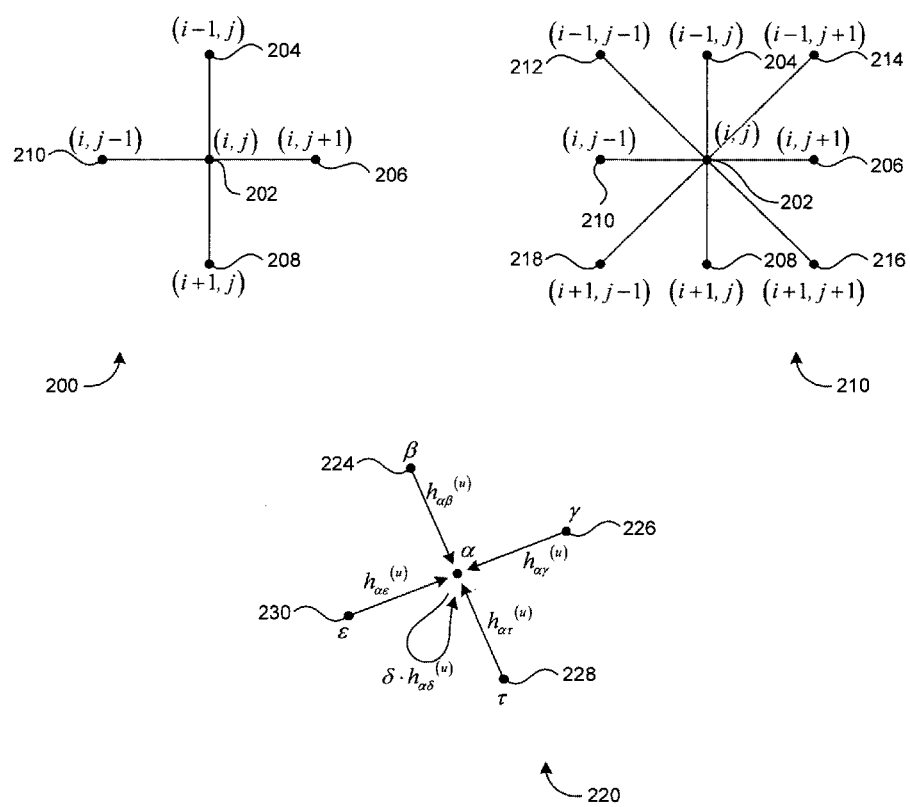
FIG. 2 depicts diagrammatic views of neighboring pixels of a high-resolution pixel and filtering coefficients to be applied to the pixels, according to one embodiment.

FIG. 2 depicts diagrammatic views 200, 210 of neighboring pixels of a high-resolution pixel and filtering coefficients 220 to be applied to the pixels, according to one embodiment.

As described in the process flow of FIG. 1, the total variational filter for image zooming with intensity preservation is a function of the magnitude variation between a pixel on which the filter is to be applied an its neighboring pixels. In designing the filter to be applied to a particular high-resolution pixel, neighboring pixels of the particular high-resolution pixel can be identified, for example, as shown by the set of pixels 200. In the example of the set of pixels 200, the pixel 202 located at coordinates (i, j) on a grid has a set of neighboring pixels 204, 206, 208, and 210 located on the grid at (i, j±1), (i±1).

In another embodiment, the pixel 202 represented as (i, j) on a grid can have a set of neighboring pixels 212, 214, 216, 218 located at coordinates (i∓1, j±1), (i±1, j±1) in addition to the neighboring pixels 204, 206, 208, and 210 located at coordinates (i, j±1), (i±1) as shown in 200. Accordingly, other neighboring configurations suitable for determining magnitude variations are contemplated in the derivation of the total variational filter to be applied to each pixel, and are in accordance with the novel art of this disclosure.

The example schematic 220 of FIG. 2 illustrates diagrammatically the filter coefficients ($h_{\alpha\beta}, h_{\alpha\gamma}, h_{\alpha\tau}, h_{\alpha\epsilon}$) of the total variational filter to be applied to the high-resolution pixel '$\alpha$'. As previously discussed, the filter coefficients are, in one embodiment, determined based on the magnitude variations between the high-resolution pixel '$\alpha$' and the neighboring pixels including $\beta, \gamma, \tau, \epsilon$. The arrows depict multiplication of the u value at the tail node of the arrow by the filter coefficients ($h_{\alpha\beta}, h_{\alpha\gamma}, h_{\alpha\tau}, h_{\alpha\epsilon}$) along the arrow and added to the pixel value of the high-resolution pixel a. In one embodiment, the pixel value '$\delta$' determined from the conditions outlined in FIG. 1 for energy conservation is weighted by the filter coefficient $h_{\alpha\delta}$.

In particular, in one embodiment, the filter coefficients can be determined by:

$$h_{\alpha\beta}(u) = \frac{w_{\alpha\beta}(u)}{\lambda + \sum_{\gamma \sim \alpha} w_{\alpha\gamma}(u)},$$

where $w_{\alpha\beta}(u) = \frac{1}{|\nabla_\alpha u|_\alpha} + \frac{1}{|\nabla_\beta u|_\alpha}$, and $h_{\alpha\alpha}(u) = \frac{\lambda}{\lambda + \sum_{\gamma \sim \alpha} w_{\alpha\gamma}(u)}$ FIG. 3 depicts a diagrammatic view of the pixel values of a low-resolution image 302 and a corresponding high-resolution image 304 for intensity preservation, according to one embodiment.

The diagram illustrates an example of how the pixel values of the high-resolution image are computed such that the energy between the high-resolution image 304 and the corresponding low-resolution image 302 are substantially the same. In the example of FIG. 3, the resolution of the low-resolution image 302 is doubled to obtain the high-resolution image 304. Thus, the area of the four pixels in the high-resolution image 304 corresponds to the area of one low-resolution pixel of the low-resolution image 302.

$u_\alpha^{low}$ in the example of FIG. 3 represents the pixel value of the pixel 302a. $u_{\gamma_1}, u_{\gamma_2}$, and $u_{\gamma_3}$ represent the pixel values at the high resolution pixels 304a, 304b, and 304c, respectively. '$\delta$' represents the pixel value to be determined at the pixel 304d. The pixel values of the high resolution pixels 304a-d, as discussed in detail in the description of FIG. 1, can be evaluated by solving:

$$\delta = 4 * u_\alpha^{low} - \sum_\gamma u_\gamma$$

, where A=4, represents the number of pixels in the high-resolution image that corresponds to the area of the low-resolution pixel 203a.

In one embodiment, the pixel values of the high-resolution image are set such that the average of the high-resolution pixel values is substantially equivalent to the pixel value of the low-resolution pixel that corresponds to the area of the high-resolution image. Thus, as shown in the example of FIG. 3, the pixel value of the low-resolution pixel 302a, $u_\alpha^{low}$, should be similar in magnitude to average of the high pixel values, or, $$\frac{u_{\gamma_1} + u_{\gamma_2} + u_{\gamma_3} + \delta}{4},$$

which is equivalently, $\delta = 4 * u_\alpha^{low} - \sum_\gamma u_\gamma$

Figure 4:
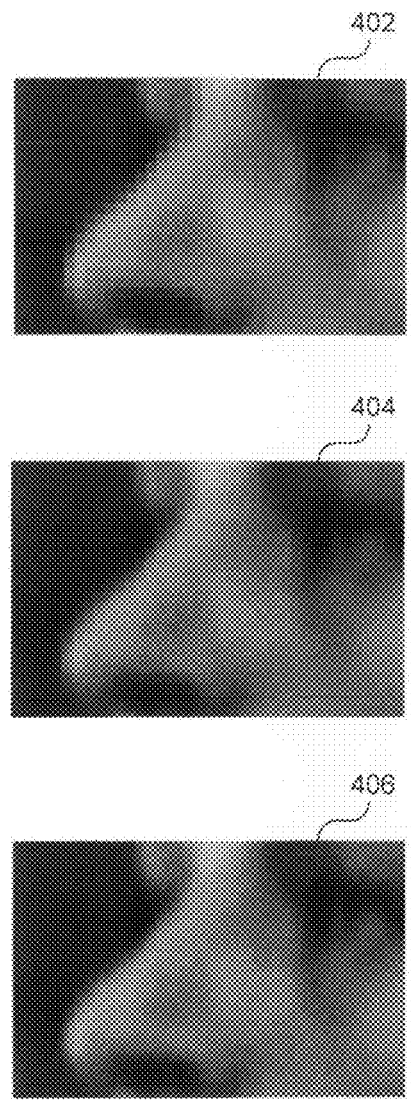
FIG. 4 illustrates a pixel duplication enlarged image, a Mitchell filter enlarged image, and a total variational filter enlarged image with intensity preservation, according to one embodiment.

FIG. 4 illustrates a pixel duplication enlarged image 402, a Mitchell filter enlarged image 404, and a total variational filter enlarged image with intensity preservation 406, according to one embodiment.

Pixel duplication is a method that can be used for enlarging an image via interpolation by pixel duplication. In some instances, the interpolation of pixel duplication conserves the original sampling of the image. The Mitchell filter is an image resampling algorithm for applications such as transforming images into a higher resolution. As can be seen, the total variational zoom with energy and/or work preservation provides a clearer and sharper zoomed image 406 as compared to pixel duplication 402 and the Mitchell filter 404.

Figure 5:
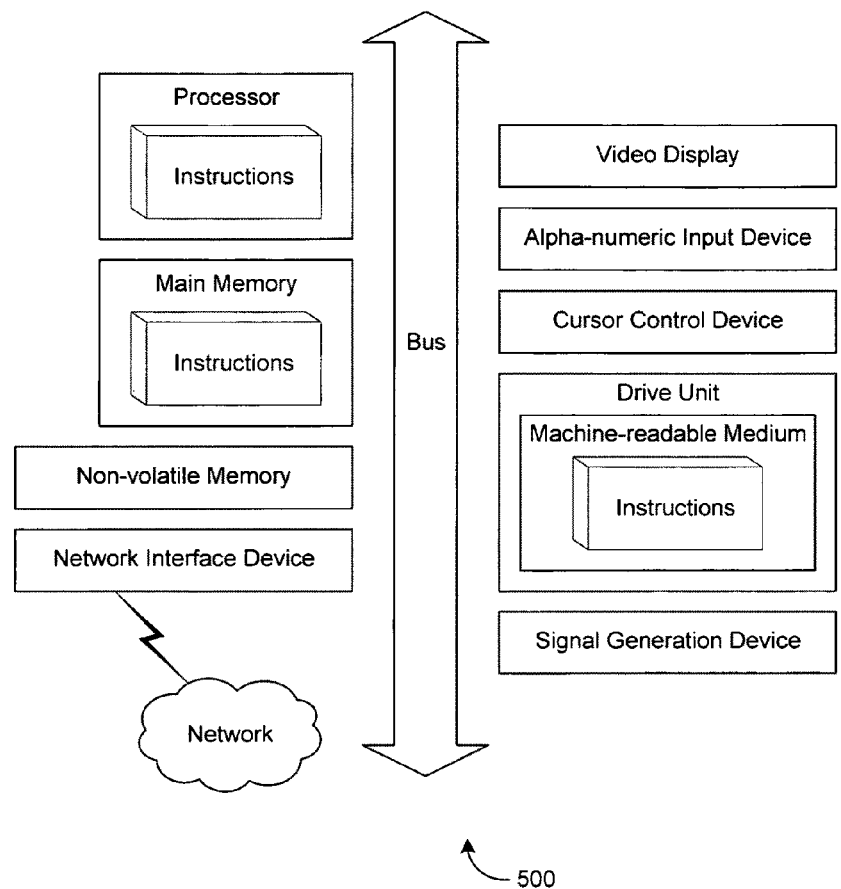
FIG. 5 shows a diagrammatic representation of a machine in the example form of a computer system within which a set of instructions, for causing the machine to perform any one or more of the methodologies discussed herein, may be executed, according to one embodiment.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific example embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of enlarging an image, the method comprising: minimizing energy levels of a set of high-resolution image pixels of a high-resolution image via total variational filtering the set of high-resolution image pixels, the high-resolution image to be an enlarged version of at least a portion of a low-resolution image, the at least a portion of the low-resolution image to have an area substantially equal to that of the high-resolution image, wherein the low-resolution image corresponds to a first energy level and the high resolution image corresponds to a second energy level, the first energy level to have substantially a same value as the second energy level.

2. The method of claim 1, further comprising determining a first magnitude variation of a high-resolution image pixel and a first neighboring pixel of the high-resolution image pixel.

3. The method of claim 2, further comprising determining a second magnitude variation of the high-resolution image pixel and a second neighboring pixel of the high-resolution image pixel.

4. The method of claim 3, further comprising determining a plurality of magnitude variations between the high-resolution image pixel and a plurality of neighboring pixels of the high-resolution image pixel.

5. The method of claim 1, wherein the minimizing energy comprises, filtering the high-resolution image pixels with a filter associated with the plurality of magnitude variations.

6. The method of claim 5, further comprising determining a pixel value of a particular high-resolution image pixel based on the pixel values of a plurality of pixels of the at least a portion of the low-resolution image and the pixel values of the high-resolution image pixels not including the particular high-resolution image pixel.

7. The method of claim 6, further comprising identifying the pixel values of a set of high-resolution image pixels, such that, the average value of the pixel values of the set of high-resolution pixels is substantially equal to the average of pixel values of the at least a portion of the low-resolution image.

8. The method of claim 2, wherein the magnitude variation is computed via the ordinary Euclidean gradient.

9. A non-transitory computer readable medium embodying computer executable instructions, the instructions causing a computer to perform a method of image zooming, the method comprising:
minimizing energy levels of a set of high-resolution image pixels of a high-resolution image via total variational filtering the set of high-resolution image pixels, the high-resolution image to be an enlarged version of at least a portion of a low-resolution image, the at least a portion of the low-resolution image to have an area substantially equal to that of the high-resolution image, wherein the low-resolution image corresponds to a first energy level and the high resolution image corresponds to a second energy level, the first energy level to have substantially a same value as the second energy level.

10. The non-transitory computer readable medium of claim 9, further comprising determining a plurality of magnitude variations between a high-resolution image pixel of the high-resolution image and a plurality of neighboring pixels of the high-resolution image pixel.

11. The non-transitory computer readable medium of claim 9, wherein the minimizing energy comprises, filtering the high-resolution image pixels with a filter associated with the plurality of magnitude variations.

12. The non-transitory computer readable medium of claim 11, further comprising determining a pixel value of a particular high-resolution image pixel based on the pixel values of a plurality of pixels of the at least a portion of the low-resolution image and the pixel values of the high-resolution image pixels not including the particular high-resolution image pixel.

13. The non-transitory computer readable medium of claim 12, further comprising identifying the pixel values of a set of high-resolution image pixels, such that, the average value of the pixel values of the set of high-resolution pixels is substantially equal to the pixel values of the at least a portion of the low-resolution image.

14. The non-transitory computer readable medium of claim 9, wherein the magnitude variation is computed via the ordinary Euclidean gradient.

15. A system of enlarging an image, the system comprising:
means for, minimizing energy levels of a set of high-resolution image pixels of a high-resolution image via total variational filtering the set of high-resolution image pixels, the high-resolution image to be an enlarged version of at least a portion of a low-resolution image, the at least a portion of the low-resolution image to have an area substantially equal to that of the high-resolution image,
wherein the low-resolution image corresponds to a first energy level and the high resolution image corresponds to a second energy level, the first energy level to have substantially a same value as the second energy level.

16. The system of claim 15, further comprising determining a plurality of magnitude variations between a high-resolution image pixel of the high-resolution image and a plurality of neighboring pixels of the high-resolution image pixel.

17. The system of claim 15, wherein the minimizing energy comprises, filtering the high-resolution image pixels with a filter associated with the plurality of magnitude variations.

18. The system of claim 17, further comprising determining a pixel value of a particular high-resolution image pixel based on the pixel values of a plurality of pixels of the at least a portion of the low-resolution image and the pixel values of the high-resolution image pixels not including the particular high-resolution image pixel.

19. The system of claim 18, further comprising identifying the pixel values of a set of high-resolution image pixels, such that, the average value of the pixel values of the set of high-resolution pixels is substantially equal to the pixel values of the at least a portion of the low-resolution image.

* * * * *